(12) United States Patent
Dorne et al.

(10) Patent No.: US 7,406,475 B2
(45) Date of Patent: Jul. 29, 2008

(54) SOFTWARE TOOL FOR HEURISTIC SEARCH METHODS

(75) Inventors: Raphael Dorne, Ipswich (GB); Christos Voudouris, Ipswich (GB)

(73) Assignee: British Telecommunications public limited company, London (GB)

( * ) Notice: Subject to any disclaimer, the term of this patent is extended or adjusted under 35 U.S.C. 154(b) by 415 days.

(21) Appl. No.: 10/250,950

(22) PCT Filed: Jan. 8, 2002

(86) PCT No.: PCT/GB02/00051

§ 371 (c)(1),
(2), (4) Date: Jul. 9, 2003

(87) PCT Pub. No.: WO02/056249

PCT Pub. Date: Jul. 18, 2002

(65) Prior Publication Data

US 2004/0049479 A1    Mar. 11, 2004

(30) Foreign Application Priority Data

Jan. 9, 2001 (EP) .................................. 01300150
May 14, 2001 (GB) .................................. 0111725.8

(51) Int. Cl.
    *G06F 7/00*      (2006.01)
    *G06F 9/46*      (2006.01)
    *G06F 15/18*     (2006.01)

(52) U.S. Cl. .............................. 707/100; 707/2; 705/8; 706/13

(58) Field of Classification Search ................ 707/1–10, 707/100–102, 104.1, 200–201; 705/7–9; 709/203, 224; 706/13
See application file for complete search history.

(56) References Cited

U.S. PATENT DOCUMENTS

| 5,666,469 | A | * | 9/1997 | Lee ............................. 706/46 |
| 6,021,405 | A | * | 2/2000 | Celis et al. .................... 707/2 |
| 6,031,984 | A | * | 2/2000 | Walser .......................... 703/2 |
| 6,086,617 | A | * | 7/2000 | Waldon et al. ................. 703/2 |
| 6,205,441 | B1 | * | 3/2001 | Al-omari et al. ............... 707/2 |
| 6,246,972 | B1 | * | 6/2001 | Klimasauskas ................ 703/2 |
| 6,272,483 | B1 | * | 8/2001 | Joslin et al. ................... 706/62 |
| 6,336,110 | B1 | * | 1/2002 | Tamura et al. ................. 706/46 |
| 6,374,227 | B1 | * | 4/2002 | Ye ................................ 705/8 |

(Continued)

OTHER PUBLICATIONS

Wang "From Simplex Methods to Interior-Point Methods: A Brief Survey on Linear Programming Algorithms (Term Paper)", 'Online!, Mar. 17, 1999, Department of Computer Science, Oregon State University Corvallis, Oregon, USA, XP002313454.

(Continued)

*Primary Examiner*—Miranda Le
(74) *Attorney, Agent, or Firm*—Nixon & Vanderhye P.C.

(57) ABSTRACT

A modeling tool for building a model of a problem involves a plurality of variables, whereby a heuristic search method can be carried out to optimize a solution for the modeled problem. The model of a problem includes a plurality of expressions defined as corresponding to one or more declarative statements and at least some of the expressions are dependent on at least one of the variables. The problem modeling tool can include automatically updating each declarative statement in response to changes to each variable associated therewith.

6 Claims, 10 Drawing Sheets

U.S. PATENT DOCUMENTS

| | | | |
|---|---|---|---|
| 6,483,808 B1 * | 11/2002 | Rochberger et al. | 370/238 |
| 6,678,640 B2 * | 1/2004 | Ishida et al. | 702/189 |
| 6,768,973 B1 * | 7/2004 | Patel | 703/2 |
| 6,823,315 B1 * | 11/2004 | Bucci et al. | 705/9 |
| 6,826,549 B1 * | 11/2004 | Marks et al. | 706/11 |
| 6,853,991 B1 * | 2/2005 | Kermani | 706/52 |
| 6,912,515 B2 * | 6/2005 | Jackson et al. | 706/19 |
| 7,010,746 B2 * | 3/2006 | Purvis | 715/517 |
| 7,028,301 B2 * | 4/2006 | Ding et al. | 718/104 |
| 2001/0013027 A1 * | 8/2001 | Akkiraju et al. | 706/21 |
| 2002/0010667 A1 * | 1/2002 | Kant et al. | 705/35 |
| 2002/0099672 A1 * | 7/2002 | Ganesh | 706/1 |
| 2002/0184176 A1 * | 12/2002 | Fromherz et al. | 706/45 |
| 2007/0011123 A1 * | 1/2007 | Ruml et al. | 706/45 |

OTHER PUBLICATIONS

Megidoo, "Encyclopedia of Microcomputers", vol. 10, 'Online!, 1992, Marcel Dekker Inc., New York, New York, USA, XP002313455.

Chandru et al, "175 Years of Linear Programming—Part 3. Pune's Gift", Resonance—The Journal of Science Education, 'Online! May 1999, XP002313453.

Gartner, "A Subexponential Algorithm for Abstract Optimization Problems", Oct. 24, 1992, Foundations of Computer Science, 1992, Proceedings, $33^{rd}$ Annual Symposium on Pittsburgh, PA USA Oct. 24-27, 1992.

Vaidya, "Institute of Electrical and Electronics Engineers: A New Algorithm for Minimizing Convex Functions over Convex Sets", Annual Symposium on Foundations of Computer Science. Research Triangle Park, Oct. e0-Nov. 1, 1989, Washington, IEEE Comp. Soc. Press, US.

* cited by examiner

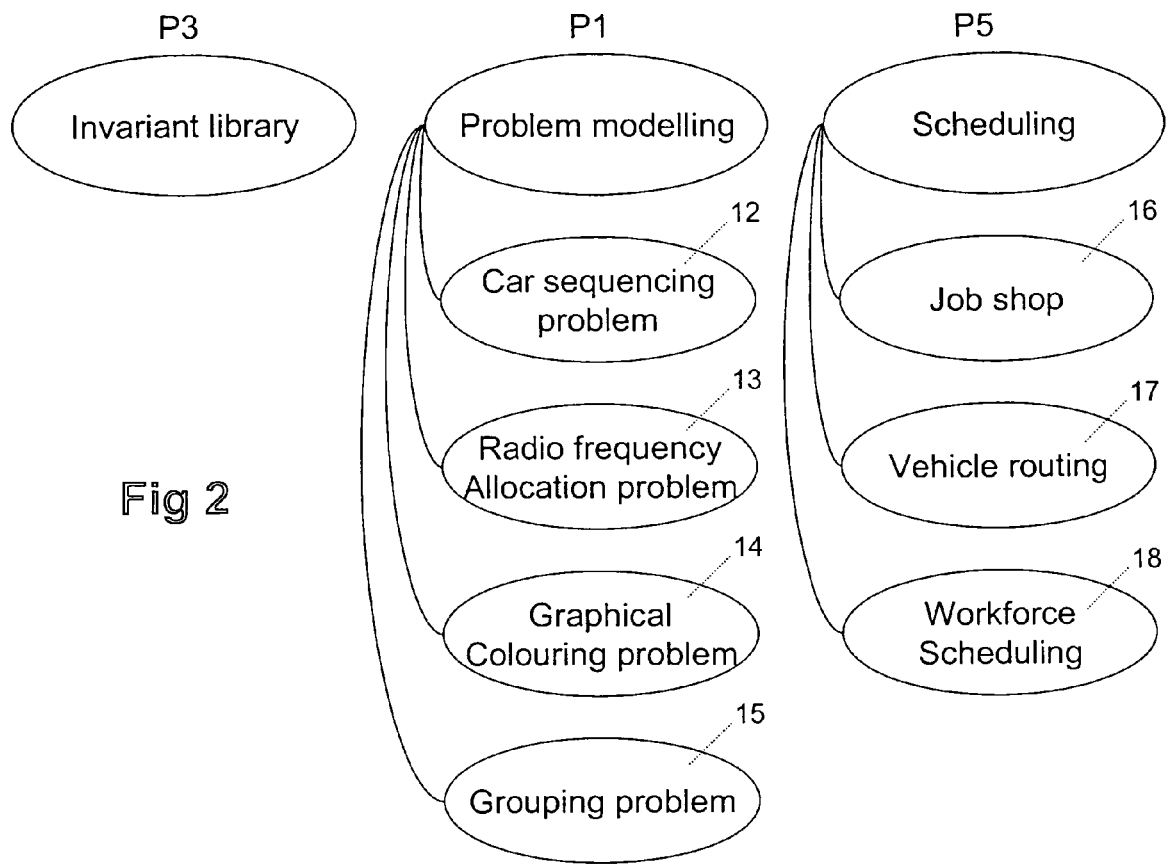
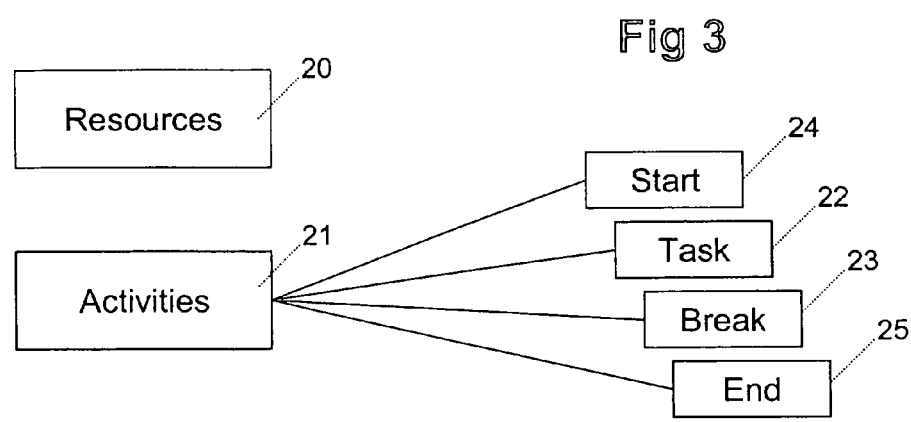

SOFTWARE TOOL FOR HEURISTIC SEARCH METHODS

This application is the U.S. national phase of international application PCT/GB02/00051 filed 8 Jan. 2002 which designated the U.S.

FIELD OF THE INVENTION

This invention relates to a software tool for heuristic search methods and has particular but not exclusive application to solving complex numerical problems based on real-world applications.

BACKGROUND

Typically a problem can be defined by decision variables, an objective function and functional constraints. Decision variables are used to represent decisions that need to be made, while constraints describe the logical or physical conditions that the decision variables must obey. When configuring a system to solve or optimize a problem, these variables and constraints are input to the system. For example, considering the workforce management problem, a workforce manager may want to know which engineers to schedule to which task, and a corresponding decision variable may include a discrete variable with possible values comprising the different engineers, while the constraints may include the complexity of the tasks involved, skill level of technician, the duration of tasks and travel time etc.

Conventionally, a model of the problem is set up using a digital processor, and the model, or problem model, is subject to at least some of the aforementioned constraints. Different solutions to the problem can be obtained by changing decision variables of the model. For example, in the engineer-scheduling problem, the order in which engineers are scheduled to complete their tasks can be changed and other variables, such as the duration of the day during which they work, can be altered. The resulting schedules can be tested against certain objective values such as the amount of time that individual engineers are idle or are travelling, and a schedule may be chosen on the basis of whichever schedule solution best satisfies the objective values for the solution.

Thus, the problem model can be used to calculate a number of candidate solutions, which are then compared on the basis of their corresponding objective values to determine the best solution.

It would be possible to compute each possible solution for the range of values of all of the variables and then search amongst the resulting solutions for a solution which best meets the objective values. This is known as an exact searching method. Sophisticated exact searching methods normally use a tree representation for enumerating all candidate solutions. Relational constraints are used to prune parts of the tree that lead to infeasible solutions, thus reducing the searching effort.

Exact search techniques such as linear programming may be applied to the problem model. With linear programming methods are applied to complex problems, which have many and disparate types of input variables, a significant data processing overhead is involved. In more sophisticated systems, specialised mechanisms may be devised which, after a change has been made to some of the input variables, restrict the computations to only the affected parts of the problem model. These mechanisms need to be coded for each particular problem requiring expert knowledge from the programmer. Furthermore, they are tedious to implement and maintain for realistic problems, which are of complex nature.

As an alternative to exact search methods, a heuristic search can be carried out. In a heuristic search method, rather than compute or enumerate each possible candidate solution, an individual candidate solution is taken, and then one or more of the values of the decision variables used in the computation of the candidate solution is changed. A new solution is computed on the basis of the changed variables and a determination is made of whether the newly computed solution is better than the first. The process may be repeated a number of times until the resulting solution results in optimization of the objective values.

A number of different heuristic searching techniques are known in the art for optimizing the solution for the problem model. For example, in a so-called single solution or local search technique, a first solution is taken and then perturbed to determine whether a better solution can be obtained when processed by the problem model. In a so-called population search technique, a number of solutions are obtained and a so-called genetic algorithm may be used to combine parts of the solutions into new solutions to be tested with the problem model.

Hitherto, heuristic search methods have been used to optimize solutions to complex, real-world problems involving large numbers of variables. For example, proposals have been made to use heuristic search methods optimize schedules used in workforce management, where field service engineers may need to perform repair tasks at different locations at different time of the day, according to a schedule. The schedule needs to be optimized as a function of the travel required by the engineers to complete their allocated tasks, the number of tasks left unallocated given the available number of engineers, and delays in task execution, the engineer skills and how well they match to task requirements and other factors such as the urgency of the individual tasks. Heuristic search methods have also been proposed for optimizing the scheduling of telephone calls, e.g. incoming calls to operations in a call center, and also for the allocation of frequency bands for use by radio transmitters e.g. in a cellular mobile telecommunications network.

However, difficulties have been encountered in formulating suitable problem models for use with heuristic search optimization methods, and an individual problem model usually needs to be specially crafted and set up for a particular problem. Furthermore it has been found that different heuristic searching techniques have different levels of efficiencies for different problem models so that, when a particular problem model has been designed and a particular heuristic search technique associated with it, it is extremely difficult to change the configuration without extensive reprogramming.

The present invention seeks to overcome these difficulties.

SUMMARY OF THE INVENTION

The exemplary embodiment of the invention provides a method of optimizing allocation of resources for a resource allocation problem, the problem being defined by problem variables, problem expressions, problem constraints and an objective function to be optimized in accordance with a predetermined optimization criterion, wherein the problem variables are representative of at least some of resources to be allocated, temporal parameters associated with allocation of the resources, tasks to be performed, costs associated with allocation of resources, capabilities of the resources and capacity of the resources, the problem expressions are representative of relationships between the problem variables, and the problem constraints are representative of constraints placed upon the problem variables. The method comprises:

i. building a model of said resource allocation problem in accordance with said problem variables, problem expressions, problem constraints, and objective function, ii. generating a solution to the modeled problem, the initial solution comprising a set of values representative of at least some of the problem variables, iii. applying a change to the solution by modifying one or more values in the set, iv. identifying problem expressions directly and/or indirectly dependent on the modified values, v. of the dependent problem expressions identified at step (iv), a. selecting an identified problem expression from the dependent problem expressions identified at step (iv), b. evaluating whether one or more inputs to the selected problem expression has changed, c. if the or each input has not changed, marking the selected problem expression, and all problem expressions dependent on the said selected problem expression as unchanged, d. selecting the next problem expression identified at step (iv), and e. repeating steps (b)-(d) until there are no further problem expressions to be selected.

The exemplary embodiment of this invention also provides a problem modeling tool for building a model of a problem where the problem involves a plurality of variables and a heuristic search method can be carried out to optimize a solution for the modeled problem. The model of a problem comprises a plurality of expressions defined as corresponding one or more declarative statements and at least some of the expressions are dependent on at least one of said variables. The problem modeling tool includes means for automatically updating the or each declarative statement in response to changes to the or each variable associated therewith.

By the use of declarative statements in accordance with an exemplary embodiment of the invention a problem model can be built in which constraints and objective values can be declaratively presented in the programs, resulting in a significant simplification of the model. Furthermore, the declarative statement may be defined using a plurality of operators, including Boolean, arithmetic, logical, string, object and set operators.

The variables comprise dynamic parameters and static parameters. Dynamic parameters include decision variables, which comprise part of the candidate solution to be optimised and are thus modified during the heuristic search method. Static parameters include user-specified parameters, which are unchanged by the heuristic search method, e.g. number of resources available.

Each declarative statement used in the problem model may be so arranged that a declarative statement based on a first set of variables, representing a first candidate solution, can be modified in response to a second set of variables, corresponding to a second candidate solution, causing update of a second declarative statement—e.g. based on changes to the second set of variables. Declarative statements can therefore themselves be dependent on other declarative statements, and updated in response to changes in other declarative statements. In this way, the processing overhead associated with producing more than one candidate solution for use in a heuristic search method, is significantly reduced.

Preferably, the problem modeling tool further includes a heuristic searching means arranged to perform a heuristic search through candidate solutions for the problem model, in order to search for an optimized solution to the modeled problem. The heuristic searching means conveniently includes a plurality of different heuristic searching parts configured so that the heuristic searching algorithm can be constructed from a selected plurality of the heuristic searching parts. The problem modeling tool additionally includes means adapted to evaluate the candidate solutions in the heuristic search for optimizing a solution to the problem.

Heuristic searching parts include computer code that can carry out operations such as search methods, where the search methods include local search or population-based search methods. The parts can be joined with one or more other parts to form a heuristic search algorithm.

Preferably the invention further includes a heuristic searching means arranged to perform a heuristic search through candidate solutions for the problem model, to search for an optimised solution to the modeled problem, wherein the heuristic searching means includes a plurality of different heuristic searching parts configured so that the heuristic searching algorithm can be constructed from a selected plurality of the heuristic searching parts.

The invention also includes a method of constructing a model of a problem, making use of the aforesaid modeling tool, and optimizing a solution to the problem being modeled. The method of constructing the model comprises defining a plurality of expressions as corresponding one or more declarative statements, where at least some of the expressions are dependent on at least one of said variables and describe at least in part the conditions, constraints and objectives of said problem. The method of optimizing a solution comprises constructing a heuristic searching algorithm from a plurality of heuristic searching parts and applying the constructed heuristic search algorithm to the constructed model.

The heuristic searching parts may be defined by object classes stored in a library of parts.

BRIEF DESCRIPTION OF THE DRAWINGS

Further aspects, features and advantages of the present invention will be apparent from the following description of preferred embodiments of the invention, which are given by way of example only and with reference to the accompanying drawings, in which:

FIG. 2 is a schematic diagram of object packages for the problem modeling tool;

FIG. 3 is a schematic diagram of actors for use in modeling a workforce scheduling problem;

DETAILED DESCRIPTION

Figure 1:
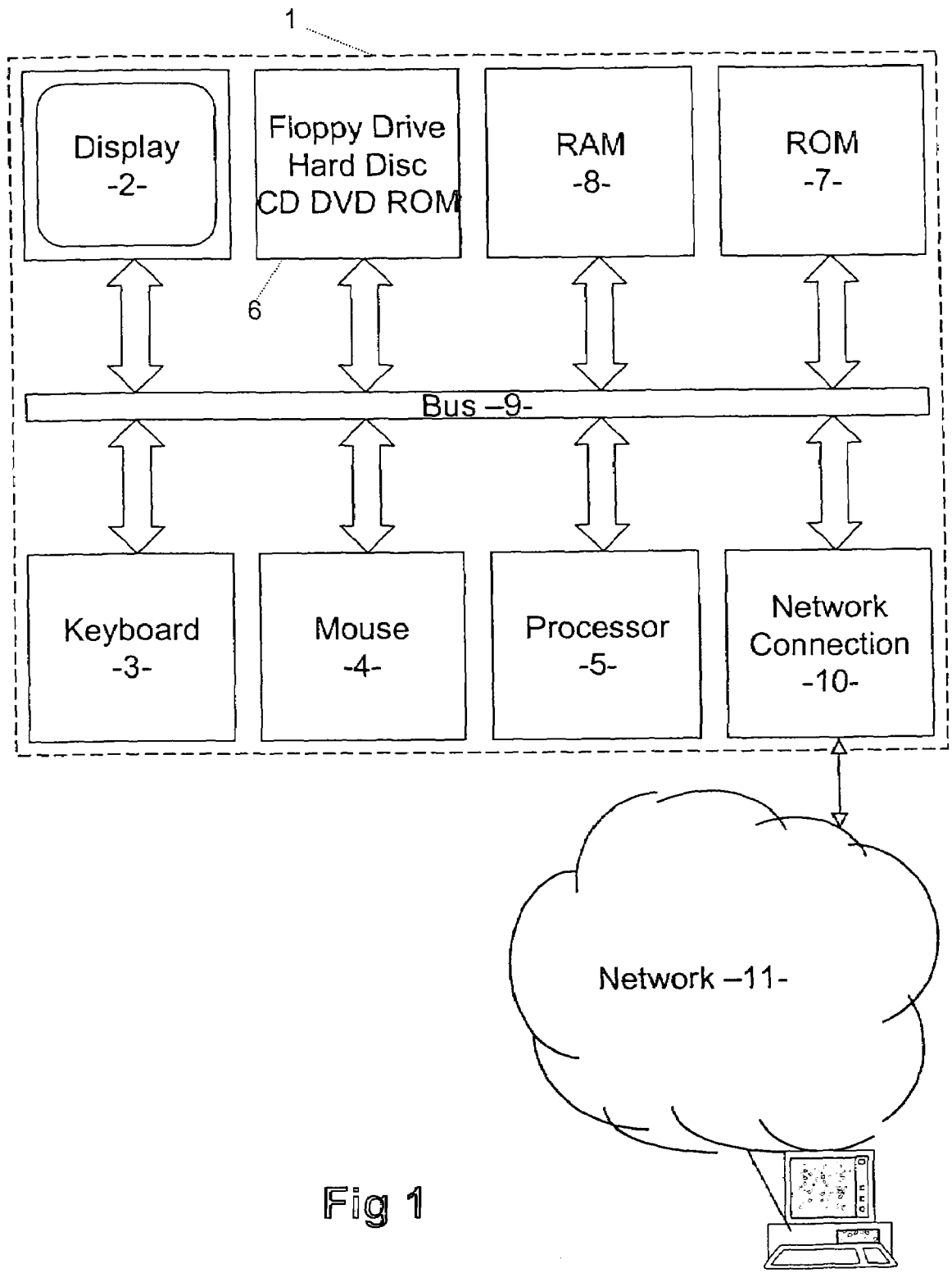
FIG. 1 is a schematic diagram of a processor configuration for running a problem modeling tool according to the invention.

In the following description, an example of a modular software modeling tool is described. The software which forms the tool can be run on any suitable data processing apparatus such as the configuration shown in FIG. 1, which comprises a conventional workstation or personal computer 1 shown in dotted outline, which, as well known in the art includes a visual display 2, keyboard 3, mouse 4, processor 5, storage in the form of a floppy disc, hard disc or CD/DVD 6, read-only memory 7 random access memory 8, all connected by a common bus 9. The configuration may also include a network connection 10 which may provide a connection to processors at remote locations through a network 11.

Programs which make up the software modeling tool may be stored on the computer-readable medium storage device 6 and run by the processor 5 under the control of the keyboard 3 and mouse 4, so as to provide an output on the display 2. The programs may also be run according to different regimes, for example in a distributed manner through the network 11 or in other configurations evident to those skilled in the art. In the following example, it is assumed that the programs which make up the modeling tool are stored in the storage device 6.

The software tool according to an exemplary embodiment of the invention adopts an object oriented approach and is programmed in an object oriented language. In the following example, the Java Programming language is used, although C++ or other procedural and/or object-oriented languages could be utilized. The tool is configured in object packages as shown in FIG. 2. The software includes a package P1 that includes an object class relating to problem modeling, to enable a particular problem to be modeled. Examples include:

a car sequencing problem 12, which models the constraints for sequencing cars on the same production line, each one with different mechanical and electrical components options to be fitted;

radio frequency allocation problem 13, which models the allocation of frequencies to transmitters for use in a mobile telephone network;

graph coloring problem 14, to model the application of assigning different colors to regions of a graphical display; and a grouping problem 15, which models the partition of a set of persons to groups subject to various constraints and preferences of these persons.

The software modeling tool also includes a package P3 of Invariants. This comprises a library of Invariant object classes which are used for model building as will be explained in more detail hereinafter.

The Invariants in package P3 are declarative expressions that represent problem constraints, conditions and objectives. In declarative programming, or with "declarative languages," the programmer tells the computer what the problem is and the computer works out how to solve it. Thus users concentrate on defining the input and output rather than the program steps required in a procedural language such as C++, COBOL or Visual Basic. Examples of declarative languages include query languages, report writers, interactive database programs, spreadsheets and application generators.

Invariant constraints are essentially conditions and objectives, the semantics of which are specified by the user, but the processing and updating of which are handled by the computer. Importantly, the computer handles this updating independently of any processing of decision variables that are featured in the constraints. For example consider decision variables x, y, for which the problem objective is to minimise $abs(x*y)$. This ($abs(x*y)$) is an invariant, which is to say that the package of invariants P3 includes a constraint satisfaction algorithm that will ensure $abs(x*y)$ is updated every time x or y change. For example, package P1, which includes the package of problem modeling code, includes procedural computer code that applies heuristic search methods to the decision variables x, y in an attempt to satisfy a problem objective. This code essentially modifies x and y by applying changes to the decision variables in accordance with a predetermined procedure defined by the code. Meanwhile, every time a change is made to x and/or y, problem objective $abs(x*y)$ is automatically and independently updated by package P3.

A further package P5 includes an object class for scheduling. Objects of the scheduling package P5 may extend objects of the problem modeling package P1.

The object classes of the scheduling package P5 may be suitable for modeling, for example:

shop job scheduling 16 for scheduling the processing of job orders in a shop floor over a number of machines subject to sequencing and other constraints;

routing schedules 17 for vehicles for e.g. package delivery vehicles, and workforce scheduling 18, where individual work schedules are created for a number of technicians to carry out tasks such as repair tasks.

The modeling of a workforce scheduling problem will now be considered in more detail by way of example. Examples of at least some of the problem attributes are shown in FIG. 3, and may comprise a number of resources 20, typically comprising field engineers who are required to carry out a number of activities 21, e.g. repair tasks which each have a start time 22 (e.g. leaving the company depot), a task description 23, may involve a break 24, and have an end time 25 (e.g. returning to the company depot).

The objective is to produce an activity schedule for the resources 20. For example, the objective may be to derive a schedule, which details times allocated to individual telephone network repair tasks for individual field service engineers, while minimizing time that the resources (engineers) spend between jobs. Typically repair tasks are automatically reported by a computer and are allocated individual priorities. These tasks, together with their times and priorities, are input to the problem modeling package P1, which is used to set up a problem model for solving this optimization problem.

In order to model the scheduling problem, a number of object classes are utilized from the packages P1, P3, P5 shown in FIG. 2.

Instances of the following classes may be used.

Class WSP (Workforce Scheduling Problem)

This class is held in the scheduling package P5 and extends an object class "Schedule" which in its turn extends the object class Problem found in package P1. In the nomenclature of Java, the class can be expressed as:

```
com.bt.examples.wsp
Class WSP
java.lang.Object
     |
     +--com.bt.mdl.Problem
            |
            +--com.bt.sch.Schedule
```

Class JOB

This extends an object class Task, which in its turn extends a class Activity found in the package P5. In the nomenclature of Java, the class can be expressed as:

```
com.bt.examples.wsp
Class Job
java.lang.Object
     |
     +--com.bt.sch.Activity
            |
            +--com.bt.sch.Task
```

Class TECH

This corresponds to an individual technician and inherits from an object class Resource found in the scheduling package P5. In the nomenclature of Java, the class can be expressed as:

```
com.bt.examples.wsp
Class Tech
java.lang.Object
     |
     +--com.bt.sch.Resource
```

As stated above, objects from the Invariant library package P3 are used to provide declarative programming capabilities within the programming language used to define the problem i.e. the scheduling model. As an example, the object of Activity will be considered in more detail, the object Activity has associated decision variables "previous" and "next". Also, Activity has associated invariants "start time" (st) and "end time" (et). These invariants define the start and end times for a particular Activity (e.g. a job to be carried out by an engineer) for use in solving the scheduling problem.

In accordance with the invention, by using the Invariants defined in the Invariant library package P3, a declarative relationship between the start and end time for successive jobs in the schedule can be defined as follows:

$$st = previous.et + delay \quad (1)$$

Thus, the start time for a particular Activity can be defined in terms of the end time of the previous activity time (i.e. for a previous task) plus a delay which may correspond to a travel time or a set up time. The delay time may be a constant i.e. a fixed time period.

Similarly, the end time for the Activity may be defined as follows:

$$et = st + duration \quad (2)$$

Also, the Activity may be subject to a constraint e.g. must be completed before a particular time e.g. 8 p.m. This can be expressed as follows:

$$et < 8\ p.m. \quad (3)$$

These relationships effectively constitute one-way data flow constraints and can be expressed in the Java programming language using the Invariant relationships from the Invariants package P3.

The Invariant library provides a large number of different declarative functions (operators—listed and described below), which can be used in defining the problem model. The advantage of using invariants is that when multiple solutions are derived from the model, the computing time required to compute the successive solutions, after modifications, is significantly reduced; previously, in Java, it would have been necessary to procedurally define all of the steps corresponding to the invariants, which would involve significantly more processing time when computing/changing individual solutions to the modeling framework. Furthermore, in formulating complex problem models, the programmer would have had to handle (write code) updating of any variables that depend on other variables, in response to changes in these other variables. This is not required with invariants, as they fully automate this task. Details of some of the classes from the Invariant library are set out below for the package P3, which is named hereinafter as "Inv":

Package com.bt.inv

P3 provides all of the necessary classes for implementing arithmetic and symbolic invariants in Java.

| | |
|---|---|
| Inv | The class Inv provides access to all the operators for building invariants. |
| Invariant | This is the base class for all expression classes. e.g. an Invariant y is given an expression of the form $y = f(x1, x2, \ldots, xn)$ and is classified by data type |
| InvariantManager | This is the manager class for the invariant network, which holds information about the invariant network and initiates the different steps of the constraint satisfaction algorithm, coordinating different operations of the algorithm. This class also collects statistics for the algorithm. |
| InvariantModelEvent | This class represents an event in the model of invariants kept in the invariant manager. This class enables an external observer to monitor changes in the structure of the Invariant Model. Examples include InvariantAdded and InvariantRemoved, which allows the user to receive notifications whenever invariants are respectively added to, or removed from, the problem model. |
| InvariantObservable | This class allows the user to get notified of changes to the current/saved value of an invariant. |

Class Inv provides access to all the operators for building invariants. These invariants, which as stated above comprise constraints and objectives, can represent input variables or expressions (i.e. derived from input variables or other expressions) of one of the basic data types Integer, Real, Boolean, Object, String. In this embodiment objects of the class do not need to be created since all of its methods are static.

| Operator Summary: Methods in class Inv | |
|---|---|
| Static BooleanExp | not (BooleanExp b) |
| Static BooleanExp | and (BooleanExp b1, BooleanExp b2) |
| Static IntegerExp | abs (IntegerExp I) |
| Static IntegerExp | plus (IntegerExp I1, IntegerExp I2) |
| Static RealExp | Prod (RealSetExp s, RealExp [ ] v) |
| static RealExp | sum (RealExp [ ] v) |
| Static BooleanExp | lt (IntegerExp I1, IntegerExp I2) |
| Static IntegerExp | elem (IntegerExp I, IntegerExp [ ] v) |

This is just a selection of a few methods. In practice, there are several hundred to cover the mathematical operations to be performed when using Invariants.

The invariant package P3 also includes the following classes, which provide housekeeping and/or monitoring of the invariants:

| | |
|---|---|
| ExternalData | This class provides the user with the ability to define external functions and predicates to be used in the computation of invariants. |
| ModelChange SessionStats | This offers access to statistics related to the model change sessions of an InvariantManager object. |
| Memento | Memento base class. This class allows the state of a variable to be stored so that the algorithm can go back to this solution at a later stage. The alternative is to store the whole invariant network, which is time/memory consuming. |
| State | This class holds a snapshot of all or some of the variables of an invariant manager using the memento classes. |

The following classes include basic data types (Integer, Real, Boolean, Object, String) referred to above, which are used to define the input variables or expressions that make up the invariants:

| | |
|---|---|
| BOOLEAN | |
| BooleanExp | This is the base class for all boolean expression classes. |
| BooleanVar | This class is used for representing boolean variables. |
| BooleanVarMemento | Memento of the value of a boolean variable. |
| INTEGER | |
| IntegerExp | This is the base class for all integer expression classes. |
| IntegerSetExp | This class implements an integer set expression. |
| IntegerSetIterator | An iterator class for integer set expressions which allows the programmer to iterate over the elements that are contained in an integer set expression. |
| IntegerSetVar | This class is used for representing integer set variables. |
| IntegerVar | This class is used for representing integer variables. |
| IntegerVarMemento | Memento of the value of an integer variable. |
| OBJECT | |
| ObjectExp | This is the base class for all object expression classes. |
| ObjectSetExp | This class implements an object set expression. |
| ObjectSetIterator | An iterator class for object set expressions which allows the programmer to iterate over the elements that are contained in an object set expression. |
| ObjectSetVar | This class is used for representing object set variables. |
| ObjectVar | This class is used for representing object variables. |
| ObjectVarMemento | Memento of the value of an object variable. |
| REAL | |
| RealExp | This is the base class for all real expression classes. |
| RealSetExp | This class implements an real set expression. |
| RealSetIterator | An iterator class for real set expressions which allows the programmer to iterate over the elements that are contained in an real set expression. |
| RealSetVar | This class is used for representing real set variables. |
| RealVar | This class is used for representing real variables. |
| RealVarMemento | Memento of the value of a real variable. |
| STRING | |
| StringExp | This is the base class for all string expression classes. |
| StringSetExp | This class implements an string set expression. |
| StringSetIterator | An iterator class for string set expressions which allows the programmer to iterate over the elements that are contained in an string set expression. |
| StringSetVar | This class is used for representing string set variables. |

Using the Classes and methods presented above, the equations (1)-(3) above can be expressed as follows:

$$IntegerExp\ st=Inv.plus(Inv.elem(\text{previous},\ et\_vector), \text{delay}); \quad \text{Equation (1)}$$

$$IntegerExp\ et=Inv.plus(st, \text{duration}); \quad \text{Equation (2)}$$

$$BooleanExp\ end\_time\_constraint=Inv.lt(et, 8); \quad \text{Equation (3)}$$

The operator elem returns the i-th element of a vector, where i is an expression or a variable. In the example above, elem is used to return the end time belonging to the "previous" activity from the vector structure holding the values of all activity end times et_vector. Also the lt operator stands for "less than", translating the equation (3) directly into code.

As stated above, the advantage of using invariants is that all expressions are automatically and efficiently updated when an input variable, such as "previous", changes, thus implementing a declarative programming paradigm inside a procedural language such as Java.

The invariant package P3 also includes means for handling the updating of variables and for making changes to the problem models. These means are known as interfaces:

| Interface Summary | |
|---|---|
| InvariantModel Listener | This is the interface that needs to be implemented by classes that want to listen for changes in the invariant model (interfaces with InvariantModelEvent) |
| Transaction | This is the interface implemented by the manager class of the Invariant network (InvariantManager). This class allows changes to be made to the invariant model, allows evaluation of the effects of changes, and allows changes to be undone etc (e.g. where changes are made to decision variables by parts of the heuristic search methods). In addition this interface enables changes to be made to values assigned to variables. The transaction class thus acts as an interface between the InvariantManager and search methods (see below), between the InvariantManager and the |

| | -continued |
|---|---|
| | Interface Summary |
| | user, and between the InvariantManager and visualisation objects (see below). |
| Variable | This interface provides methods for saving/restoring the values of variables. |

Figure 4:
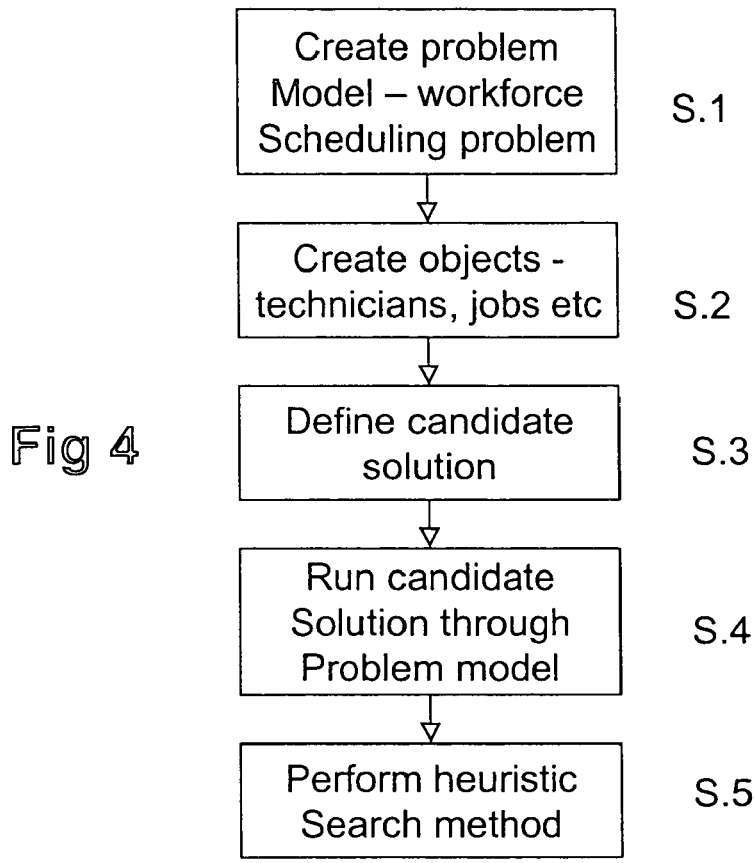
FIG. 4 is a schematic flow diagram of process steps performed in carrying out the modeling.

FIG. 4 illustrates schematically the steps involved in setting up and running a problem model, which in this case comprises a work scheduling problem model: At step S1, object classes are selected from the scheduling package P5 and optionally from the problem modeling package P1 depending on the tasks involved. At step S2, objects are created as appropriate for the model concerned e.g. TECH, JOBS, WSP.

Then, at step S3 the problem variables and problem objectives are defined in a Solution class object for the model.

Figure 5:
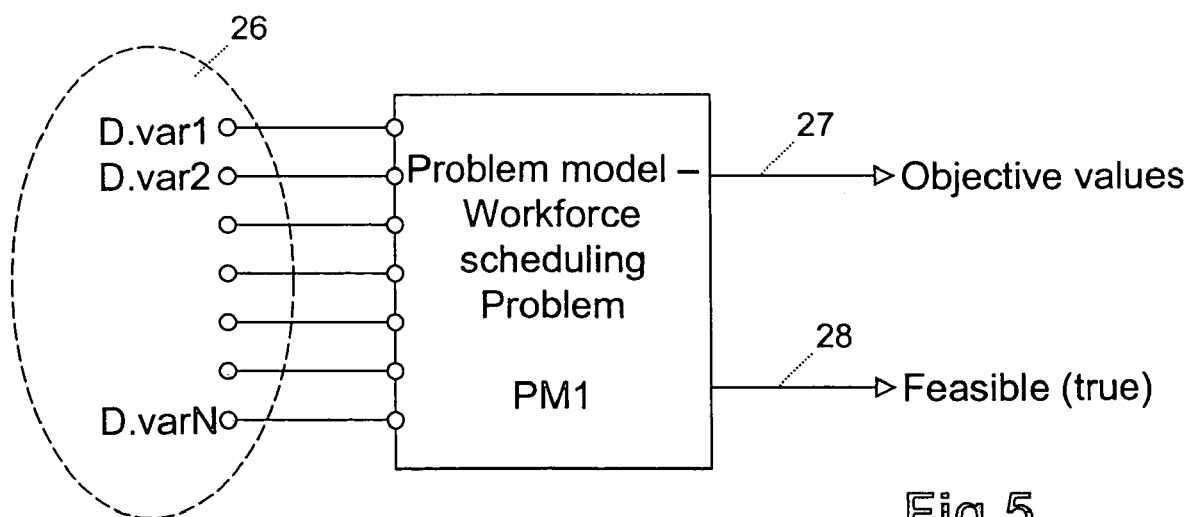
FIG. 5 is a schematic diagram of the problem modeling tool and its solution.

FIG. 5 is a schematic illustration of a problem model PM1 created using the software modeling tool. It will be understood that in this example, the problem model PM1 represents a workforce scheduling problem. At step 54, solution object 26 (defined at step S3), which contains a specific set of values of decision variables for the model i.e. number of engineers, number of tasks, task sequence for each engineer, type of tasks, task location, is run through the problem model PM1 to produce one or more objective values 27 which constitute a measure of the suitability of the candidate Solution 26. The problem model may also provide an output 28 indicative of whether the candidate solution satisfies the various problem constraints.

The running of the program at step S4 firstly involves running a constraint satisfaction algorithm, where changes to decision variables in the current solution object are automatically transferred to the invariants.

This is handled internally by the invariant package P3. Two common one-way constraint satisfaction schemes, which are methods for handling the updating of the constraints, for one-way constraints are the mark/sweep strategy and the topological ordering strategy. If the constraints are evaluated only when their values are requested, the sweep phase is known as a "lazy" evaluator. If all out-of-date constraints are evaluated as soon as the mark phase is complete, the sweep phase is called an "eager" evaluator. It has been found that mark/sweep algorithms have the advantage of being more flexible in supporting both "eager" and "lazy" evaluation modes and because of their simplicity they can be implemented efficiently.

These methods are described in Hudson, S., Incremental Attribute Evaluation: A Flexible Algorithm for Lazy Update, *ACM Transactions on Programming Languages and Systems*, Vol. 13, No. 3, pp. 315-341, July 1991; and Hoover, R., *Incremental Graph Evaluation*. PhD thesis, Department of Computer Science, Cornell University, Ithaca, N.Y., 1987 respectively. A mark/sweep algorithm has two phases: a mark and a sweep phase. In the mark phase, constraints that depend upon a changed variable are marked out-of-date. In the sweep phase, constraints whose values are requested are evaluated and the constraints are marked as up-to-date.

The mark phase includes identifying all constraints (problem expressions) that are directly or indirectly dependent on changed variables, and essentially identifies which of the constraints may potentially need to be updated. The sweep phase is essentially a recursive evaluation process, in which, for each of the problem expressions identified in the mark phase, the following steps are carried out:

1. the value of the "marked" problem expression is requested,
2. the inputs to this problem expression, if any, are identified,
3. the identified inputs are evaluated The sweep phase is recursive because step 3 essentially involves returning to step 2 for the input itself, and repeating steps 2, 3 until there are no further inputs to the input.

At any stage of the recursive process, when the identified inputs are evaluated, the algorithm identifies whether any of the input values have actually changed. If none of the inputs have changed value, there is no need to evaluate any of the problem expressions that depend on that input. Thus expressions are only evaluated when at least one of its inputs has changed value. Preferably this evaluation is incremental, so that, for example, if the problem expression=x1+x2+x3+ . . . +xn, and the only changed input is x2, the new value of the problem expression is computed from $$\text{Problem expression}_{new} = \text{Problem expression}_{old} - x2_{old} + x2_{new}$$

The invariant package P3 includes different incremental update mechanisms for different operators.

Figure 6:
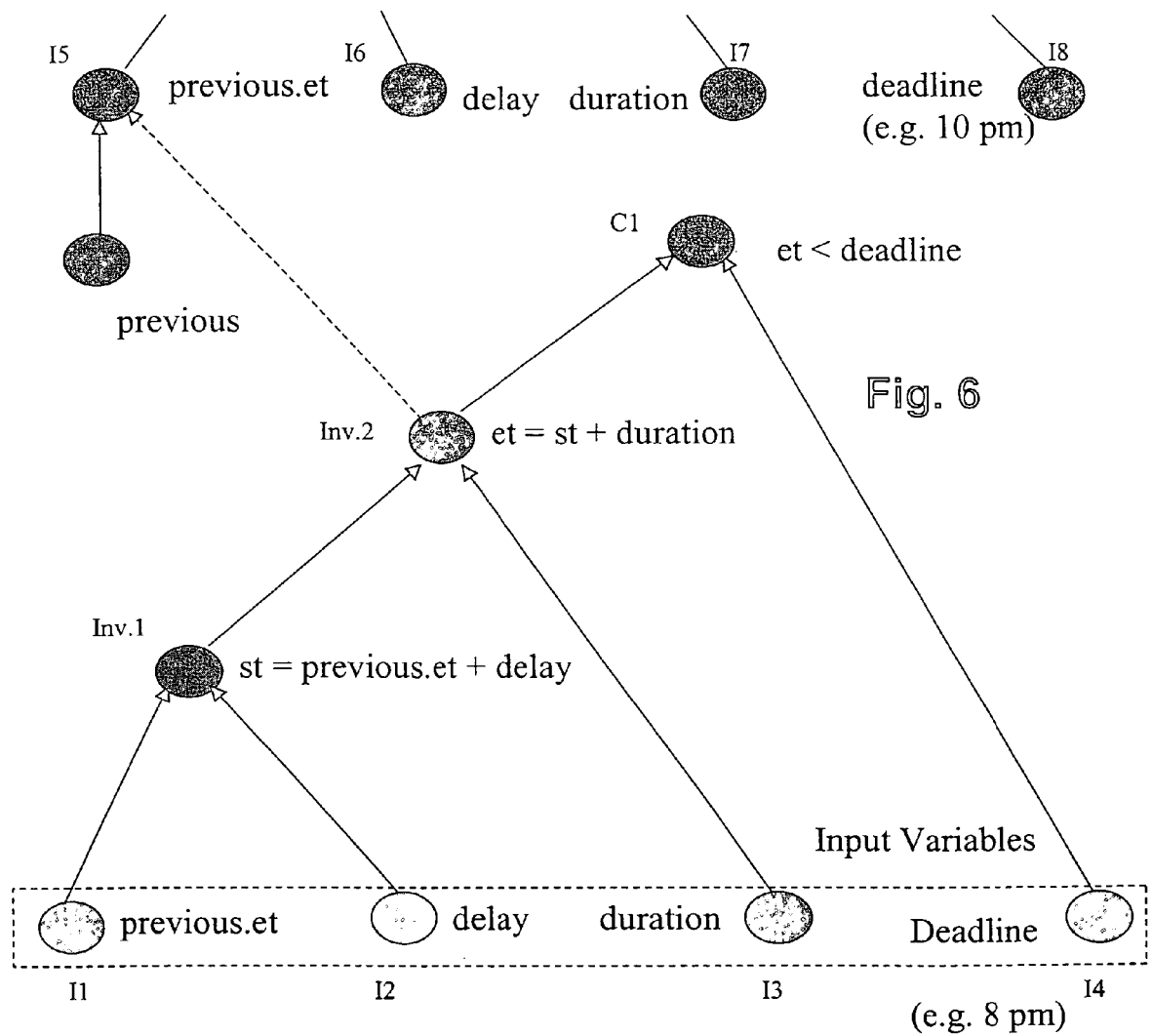
FIG. 6 is a schematic illustration of the invariants and input variables for a workforce scheduling problem, arranged in invariant blocks.
Figure 7:
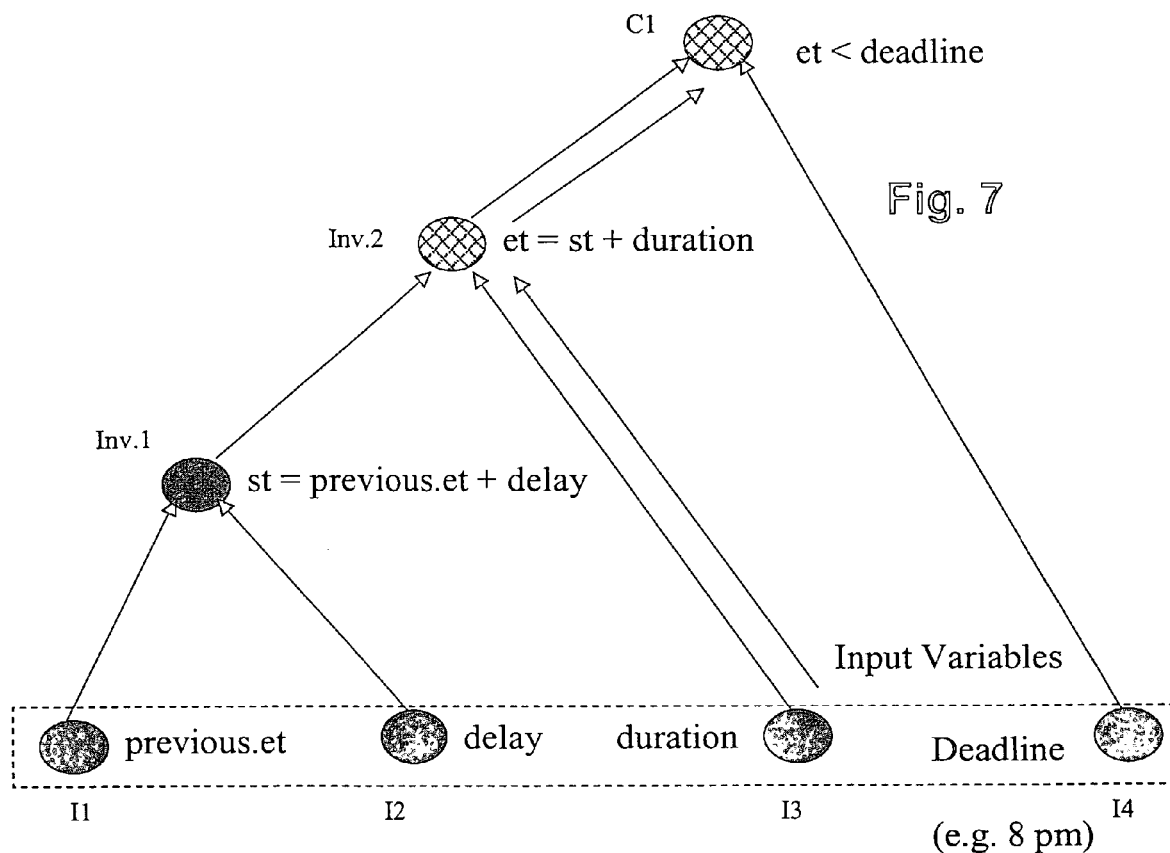
FIG. 7 illustrates a mark phase associated with the configuration of FIG. 6.

A specific example of mark and sweep strategy will now be described with reference to FIGS. 6, 7 and 8 in relation to the workforce scheduling problem. FIG. 6 illustrates first and second jobs that are carried out in a tour by an engineer, as part of the workforce scheduling problem. Each job is subject to the expressions and the constraint previously described with reference to equations (1)-(3). Thus, one job is characterised by Inv.1 and Inv.2 which correspond to equations (1) and (2) respectively, together with constraint C1 which corresponds to equation (3). The job has input variables I1, -I4, in which:

I1=previous.et, namely the end time of the previous job
I2=delay following the end time of the previous job
I3=the duration of the job
I4=a deadline by which the job must be completed e.g. 8 pm.

The next job is similarly defined in terms of expressions and constraints and is subject to input variables I5-I8 wherein:

I5=the end time (of et?) of the previous job
I6=the delay following the previous job
I7=duration of the job and
I8=a deadline by which the job must be completed e.g. 10 pm It will be understood that the end time of the previous job i.e. the outcome of Inv.2 corresponds to the value of I5, as shown by the dotted arrow. The delay I6 may correspond to the time taken for the engineer to travel from first job to the second job.

It will also be understood that I5 may not only be an input variable but also a decision variable in order to allow the job to be reordered, if necessary, to achieve a better solution to the problem.

If the jobs are similar, the same invariant block shown in FIG. 6 may be replicated many times for each job with each invariant block feeding the next with data.

Alternatively, more than one type of job may be included in which case different invariant blocks may be coupled together using the same general methodology. FIG. 7 illustrates that mark phase for a single one of the invariant blocks shown in FIG. 6, the other block being omitted to simplify the description. In this example, it is assumed that the duration of the job has changed i.e. the value of I3 has altered. During the mark phase, the invariants which will be altered by the change in value of the duration I3, are identified as "influenced" and are marked accordingly. In the schematic illustration of FIG. 7, the influenced invariants are shown having a cross-hatched pattern, namely Inv.2 and C1.

Figure 8:
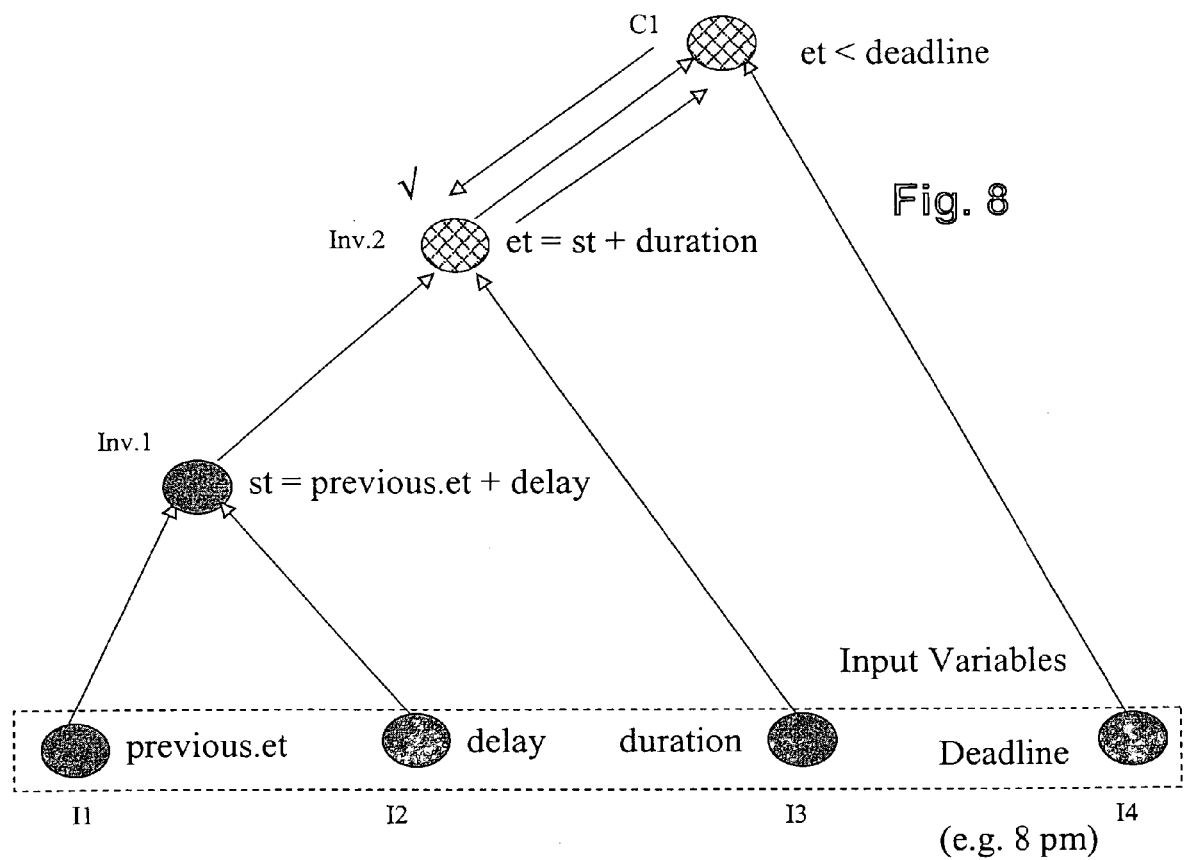
FIG. 8 illustrates an evaluation phase associated with the configuration of FIG. 7.

FIG. 8 illustrates the evaluation phase. During the evaluation phase, the influenced invariants identified during mark phase shown in FIG. 7, are updated. Only the marked invariants are updated, thereby reducing the processing load.

The evaluation phase can be started arbitrarily at any of the invariants that have been marked, or the choice may depend upon the invariant properties. Assuming that the process starts at invariant C1, then et needs to be updated first. To update et, the condition Inv.2 needs to be updated using the new value of I3. (Note that if Inv.1 had been influenced by the change to I3, it would also be necessary to backtrack to Inv.1; however, as Inv1.1 is not marked as being influenced, it is not necessary to go back further). Since the duration I3 has changed, et will also change and becomes "affected" and is marked with a tick in FIG. 8. When et gets its new value, the value of C1 is then re-evaluated. The expression et<deadline may or may not remain true and therefore may or may not be affected according to the specific values of the variables in the problem.

Thus the advantage of this mark and sweep strategy is that only the influenced invariants need to be re-evaluated and of these influenced invariants, not all of them are necessarily affected. For typical changes to the workforce scheduling problem, less than 0.5% of the invariants are influenced and an even smaller number are typically affected, meaning that only a small number of unnecessary evaluations occur. Thus, the computation time is significantly reduced as compared with a complete re-calculation of the entire model.

Referring back to FIG. 4, a Solution object is then tested against problem objectives and problem constraints, and, at step S.5, if, for example, the solution object does not satisfy one or more problem objectives, the solution (decision variables) can be manipulated by a selected heuristic search algorithm. If a change is applied to any of the decision variables (i.e. to the solution object), step S.4 is re-run, so that the effect of the changed decision variable is propagated through corresponding expressions and constraints.

The following example illustrates the effect of steps S.4 and S.5: consider a problem having decision variables x, y, an invariant x<y, which is a boolean expression and a problem constraint; and an invariant abs(x*y) which is a real expression and the problem objective. A constraint satisfaction algorithm, handled by the invariant package P3 at step S.4, will make sure that x<y and abs(x*y) are updated when x or y change values. Thus when, for example, at step S.5 of FIG. 4, a selected heuristic search algorithm manipulates the decision variables (x and y), step S.4 is invoked, ensuring that the problem constraints are evaluated.

Figure 9:
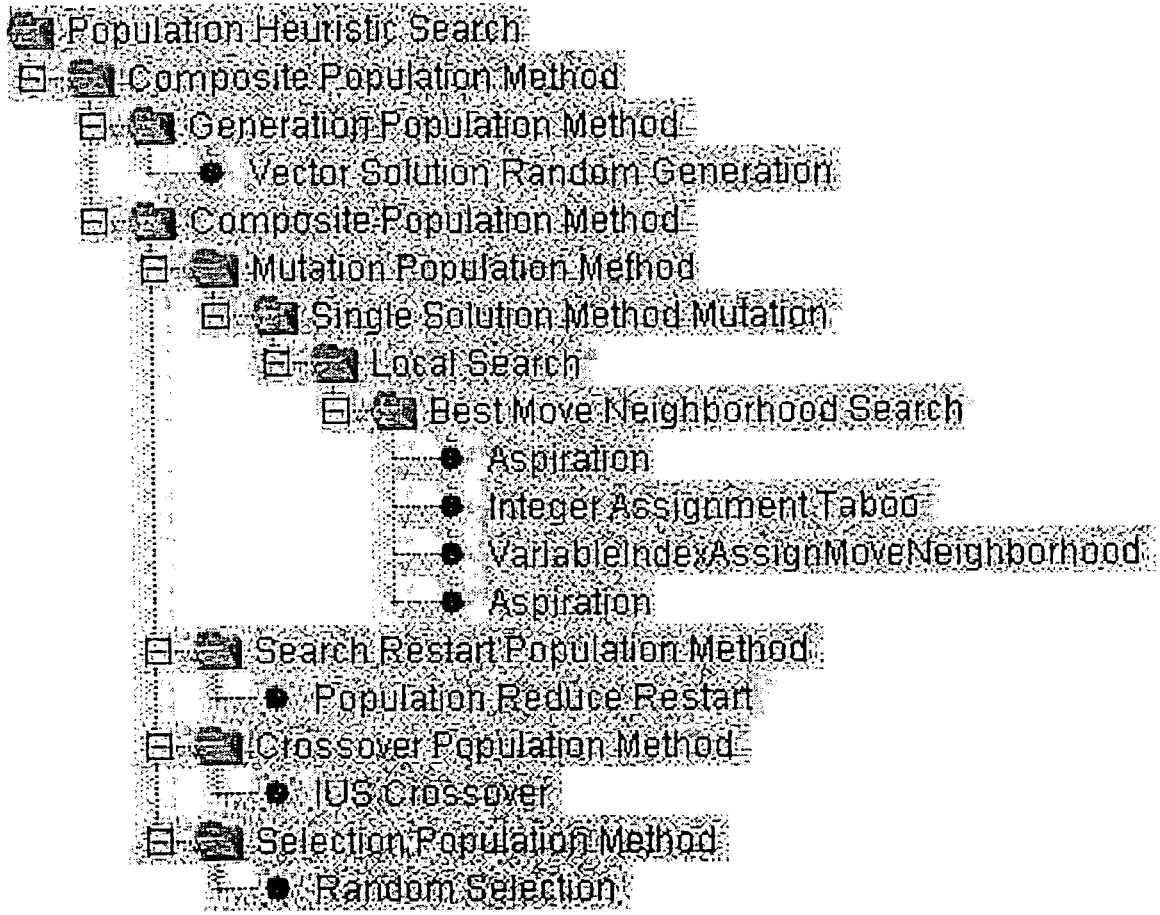
FIG. 9 is a schematic illustration of a tree of heuristic searching methods.

As is disclosed in another of our applications EP01303274.3, each heuristic search algorithm that is applied to a solution object is built from one or more heuristic search parts. Each heuristic search part is a particular type of heuristic search method; as is known in the art, there are a number of different heuristic search methods and an overview is given below. In general each of these methods is represented by a part in a library of heuristic search parts L1, shown schematically in FIG. 9.

Local Search Schemes/Methods

A small change is applied to a current solution, so as to move from the current solution to a nearby solution. Local search methods differ in the criteria used to determine whether or not the "nearby" solution then becomes the "current solution". Examples of local search methods include simulated annealing, hill climbing.

A number of different techniques are known to be suitable for implementing and processing a local search method, including Initial solution generation, for generating an initial solution, s, Neighbourhood, a subset of all possible solutions (S), designated N(s), which is associated with each solution s∈S, Neighbourhood search, which is a search among the solutions in the neighbourhood, Aspiration criterion, an example of a criterion for selecting a solution in the neighbourhood, Move, which contains all pertinent information necessary for a Neighborhood N(s) to move from a current solution s to a destination solution s'.

Dynamic objective function, which is a Function to be optimised, e.g. s*=min{f(s)|s∈S}, where f is an objective function with domain S, the set of possible solutions to a given problem, and s is one solution to the problem. and others; for more information refer to E. H. L. Aarts, J. K. Lenstra.(1997), *Local search in combinatorial optimization*, John Wiley & Sons, Chichester.

New solutions, generated by applying local search methods, are evaluated through the problem model to identify which solution best satisfies the objective function(s). Referring to the example solution 26 shown in FIG. 5, it will be understood that the solution comprises individual values of the decision variables DVar1 ... DvarN, such that the attempt to improve the solution involves applying moves to individual values of the decision variables.

Population Based Schemes/Methods (Genetic Algorithms)

A population of parent solutions interact with each other to produce a population of child (or offspring) solutions: the selection of parent solutions for interaction is often dependent on the quality of solutions, and the scheme by which they interact (e.g. type of cross-over) is dependent on the problem. In addition to inter-solution interactions, mutations can be applied to the children. The new population of offspring solutions is then considered as a population of parents for the next iteration of the method. This is repeated many times in search of (a) solution(s) having optimal quality of solution.

A number of different techniques are known to be suitable for implementing and processing a population based techniques, including initial population generation for generating an initial population, crossover for crossing elements of one solution with elements of another, mutation for applying a small change to an existing solution, selection restart population method for re-starting a search method and others; for further reading refer to D. E. Goldberg.(1989), *Genetic Algorithms in Search, Optimization, and Machine Learning*, Addison-Wesley, Reading, Mass.

As stated above, parts corresponding to these methods are stored in a "library" of parts L1 and can then be selected when creating a search algorithm so that users can "plug and play" parts together, enabling creation and testing of wide-ranging types of algorithms in a relatively short time. As a result, even a non-expert can easily build a heuristic search algorithm by selecting individual heuristic search parts and combining them to provide a particular form of a heuristic search algorithm, and the understanding, tuning and comparison of heuristic search algorithms can readily be carried out. An example of a heuristic search algorithm, built using the parts in the parts library, is shown in FIG. 6. This is a hybrid algorithm (local search plus population based search) that uses a local method to apply a mutation.

More details of the library of search parts L1, readily available in the form of object classes, are set out in the Appendix.

Invariants and Heuristic Search Parts

Known optimization methods include tools that apply exact search methods (such as linear programming methods) to problem models to identify optimum solutions. As stated in the introductory part of the description, relational constraints are particularly well suited to exact search methods, where the main goal is a reduction in the search space to be explored, since relational constraints can propagate reductions in the domain of one decision variable to the domain of other decision variables, thereby efficiently reducing the number of feasible alternatives.

Heuristic search techniques require an efficient way to access the impact of incremental solution changes to the problem's constraints (i.e. constraint checks) and also the value of the objective function. Invariants are particularly adept at this task since they can incorporate specialized incremental update mechanisms for the different operators applied to solutions, in addition to the general algorithms available for restricting the parts of the constraint graph that need to be updated after a change in the input variables (decision variables in this case).

In particular, the modular aspects of the heuristic search parts are particularly well suited to invariants. The library of search parts L1 preferably includes detector parts that plug into search parts and listen for results of applying moves and changing decision variables, and then act on the results. As described above, invariants provide automatic updating of all of the decision variables, so that the detector parts can react in real-time to changes applied by heuristic search parts. Because each heuristic search algorithm comprises a plurality of search parts plugged together, detectors can be plugged into any level of the algorithm, thereby providing a facility for reacting at a much finer scale than with other optimisation systems. Advantages include being able to evaluate and stop the algorithm at any part-to-part boundary in the algorithm rather than having to progress through the whole algorithm before evaluating it.

Interactive Visualisation Tool

Figure 10:
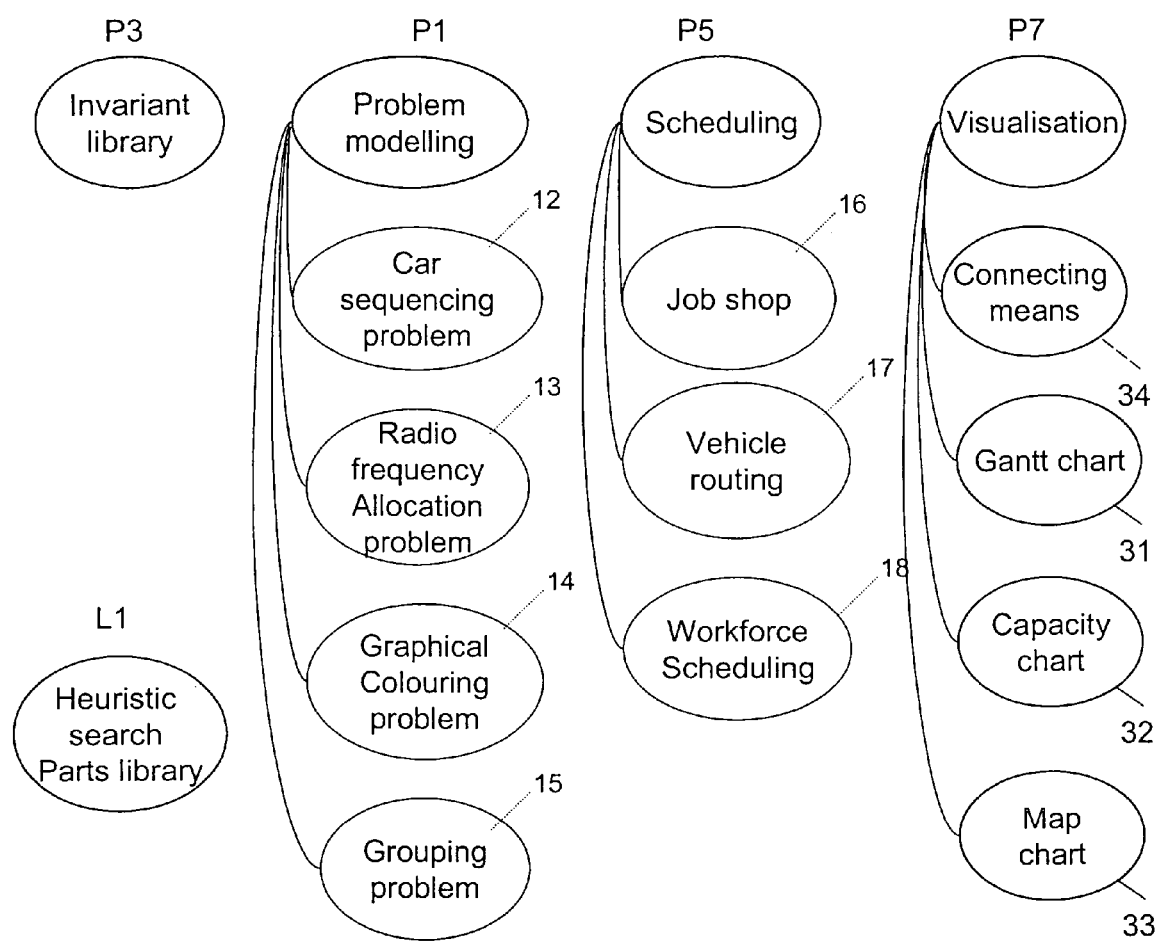
FIG. 10 is an extension of FIG. 2, and shows a visualisation package and a library of search parts for the problem modeling tool.

Embodiments of the invention optionally include a visualisation package P7, shown in FIG. 10, which includes various visualisation object classes—e.g. object classes to invoke a Gantt chart 31, a capacity chart 32 and a map chart 33—and a means 34 for connecting the visualisation objects to a problem model. A Gantt chart is a horizontal bar chart developed as a production control tool and is fully described in "A Professional's Guide to Systems Analysis", Martin E. Modell, 2nd. Ed. McGraw Hill, 1996. Capacity and map charts are problem specific visualisation applications, that are used to display vehicle capacity and routes relating to vehicle scheduling. For a specific problem model, the means 34 connects these applications into parts of the Invariant class (via the Transaction interface class described above), so that the solution 26 can be visualised by a user. FIG. 8 shows a Gantt chart plugged into a vehicle scheduling problem, where allocation of vehicles, with respect to time, is visualised. In the vehicle scheduling problem the decision variables comprising the solution 26 include time allocated to task, inter-job route and travel time, and task duration.

The following illustrates how a Gantt chart object can be configured to receive and display updates to decision variables (e.g. to allow a user to watch changes made by heuristic search algorithms):

This class represents a task entry in the Gantt Chart.

public class TaskEntry implements java.util.Observer {Task t; // t is the task as defined in the problem model Connect the TaskEntry with the underlying Task Object used to request receipt of notifications from the problem model relating to the task for specific invariants, e.g. startTime and endTime, so that visualization object knows where to display the task in a task timeline.

```
void connectToProblemModel( ) {
t.getStartTimeVar( ).getSavedValueObservable( ).addObserver(this);
    t.getEndTimeVar( ).getSavedValueObservable( ).addObserver(this);
}
```

TaskEntry object denoted by this is added as an observer of the startTime and endTime invariants, so that a TaskEntry object registers interest with the startTime and endTime invariants (startTime and endTime are invariants as defined in Equations 1 and 2).

By virtue of the TaskEntry object registering interest with the startTime and endTime invariants, the following "update" method is invoked when the value of any of the above invariants changes:

```
public void update( ) {
    setStartUnit(t.getStartTime( ));
    setEndUnit(t.getEndTime( ));
}
```

Thus suppose that the StartTime and the EndTime changed, this method will set its startUnit and endUnit to the new values obtained straight from the problem model. (setStartUnit( ) and setEndUnit( ) additionally contain code manipulating the graphics displayed on the screen and the in particular the portion of the Gantt Chart affected. Suitable code could readily be written by one skilled in the art).

Figure 11:
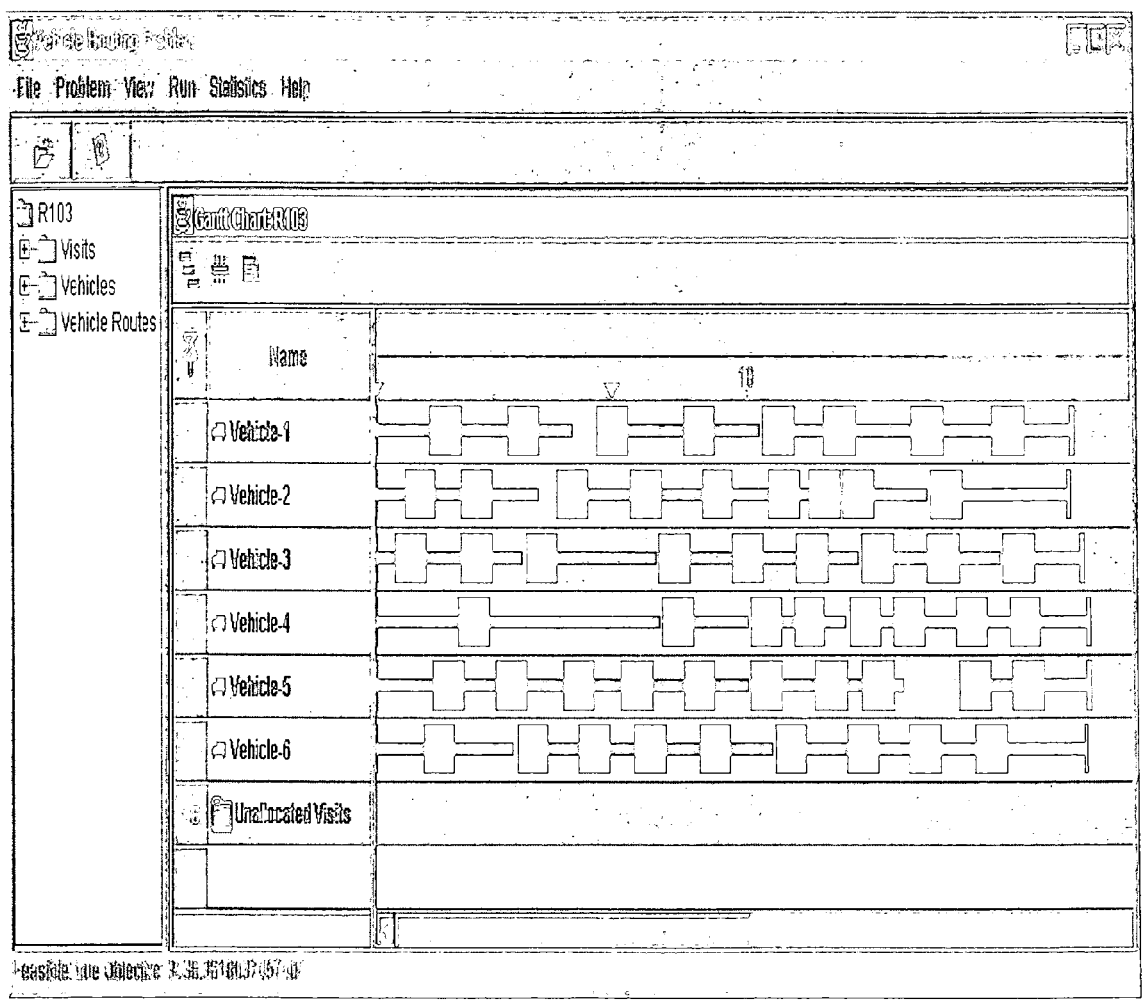
FIG. 11 is an output of the visualisation package used by the problem modeling tool.

In addition to visualising the decision variables comprising the solution 26, the applications can receive inputs from the user, and pass these inputs to the invariants via the connecting means 34. For example, considering the Gantt chart visualisation of the vehicle scheduling problem shown in FIG. 11, the user can drag and drop, in a known manner, tasks anywhere within the Gantt chart. As the Gantt chart object is plugged into the problem model via connecting means 34, movement of tasks by the user has the effect of changing the corresponding decision variables. In effect, these changes are handled in an identical manner to the handling of a heuristic search method, so that changes to decision variables are received by the InvariantManager class and propagated through the constraint satisfaction algorithm as described above.

An example of the control aspect, which defines how the user manually interacts with the Gantt Chart, is given below. In this example, the code that checks whether a task entry can be dragged and dropped from one part of the Gantt Chart to another—i.e. Package P7 includes a method called isGoodDrop( ) for checking whether a drop action is allowed or not. The code below includes excerpts from code that assesses the validity of user action—e.g. dropping a task:

```
public boolean isGoodDrop( . . . ) {
        Task        t = ((TaskEntry) entry).getTask( );
        schedule.beginValueChanges( );
        t.insert(activityBefore);
        schedule.endValueChanges( );
        if (!schedule.isFeasible( )) {
                schedule.undoValueChanges( );
                return false;
        }
the drop is not a good one
        schedule.undoValueChanges( );
        return true;
}
``` the drop is good but we shouldn't commit to it yet; this will be done in the method below Package P7 also includes code for handling validated dropping of a task to another, or to the same, resource (when the drop has been validated as described above):

```
public void dropEvent(DjtDropEvent dropEvent) {
        schedule.beginValueChanges( );
        t.insert(activityBefore);
        schedule.endValueChanges( );
        int result = schedule.propogateValueChanges( );
        schedule.saveValueChanges( );
        return;
}
```

Figure 12A:
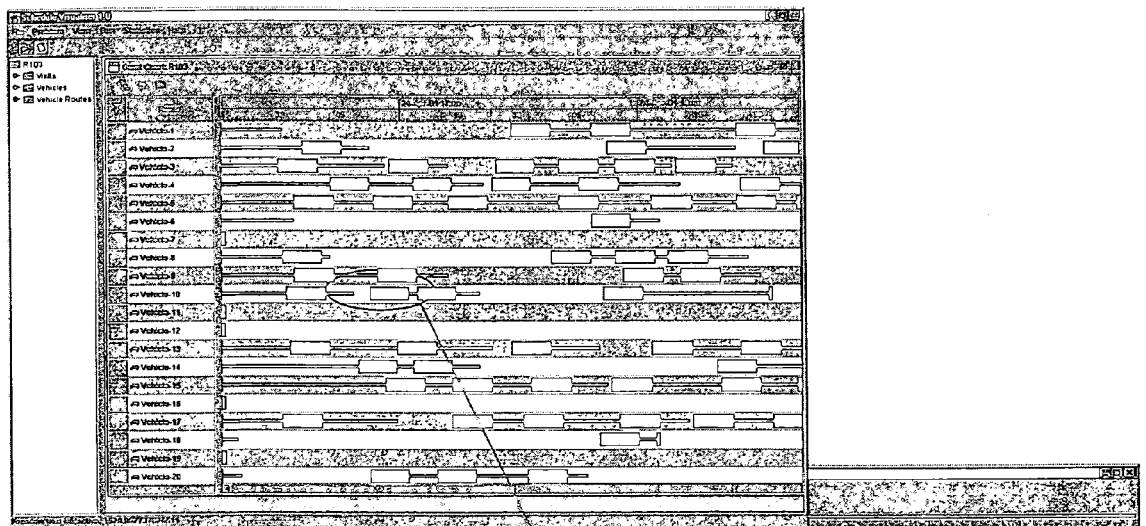
FIG. 12a is a further output of the visualisation package used by the problem modeling tool, before an on-screen modification.
Figure 12B:
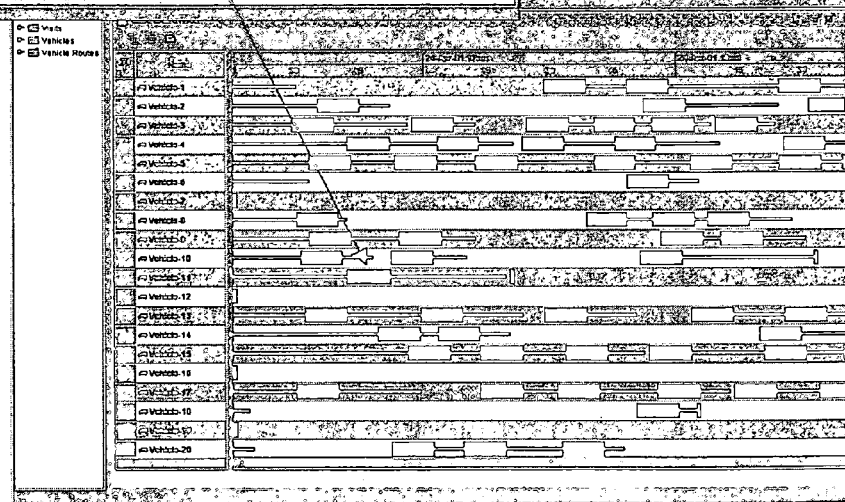
FIG. 12b is a further output of the visualisation package used by the problem modeling tool, after an on-screen modification.

FIGS. 12a and 12b respectively show "before" and "after" making a change in task allocation by dragging a task from vehicle 10 and dropping it on vehicle 11. Referring to FIGS. 12a and 12b, the InvariantManager propagates changes to corresponding decision variables, updating the constraints and problem objectives, and automatically adjusts the required travel times between tasks, as can be seen from the changes to the thick lines.

Appendix

Class Hierarchy class com.bt.hs.SearchComponent
- class com.bt.hs.aspiration.Aspiration
- class com.bt.hs.crossover.Crossover
    - class com.bt.hs.crossover.Bipoint
    - class com.bt.hs.crossover.IUS
    - class com.bt.hs.crossover.Monopoint
    - class com.bt.hs.crossover.Uniform
- class com.bt.hs.objectivevalue.DynamicObjectiveValue
    - class com.bt.hs.objectivevalue.ProblemGLS
- class com.bt.hs.mutation.Mutation
    - class com.bt.hs.mutation.SingleNeighborhoodSearchMutation
    - class com.bt.hs.mutation.SingleSolutionMethodMutation
- class com.bt.hs.neighborhood.Neighborhood
    - class com.bt.hs.neighborhood.PositionAssignMoveNeighborhood
    - class com.bt.hs.neighborhood.PositionMoveAtMoveNeighborhood
    - class com.bt.hs.neighborhood.PositionSwapMoveNeighborhood
    - class com.bt.hs.neighborhood.VariableIndexAssignMoveNeighborhood
    - class com.bt.hs.neighborhood.VariableIndexMoveAtMoveNeighborhood
    - class com.bt.hs.neighborhood.VariableIndexSwapMoveNeighborhood
- class com.bt.hs.neighborhoodsearch.NeighborhoodSearch
    - class com.bt.hs.neighborhoodsearch.CompositeNeighborhoodSearch
        - class com.bt.hs.neighborhoodsearch.PerformAllCNS
        - class com.bt.hs.neighborhoodsearch.PerformBestOfAllCNS
    - class com.bt.hs.neighborhoodsearch.SingleNeighborhoodSearch
        - class com.bt.hs.neighborhoodsearch.AspirationPlus
            - class com.bt.hs.neighborhoodsearch.CircularAspirationPlus
            - class com.bt.hs.neighborhoodsearch.RestartAspirationPlus
        - class com.bt.hs.neighborhoodsearch.BestImprovement
        - class com.bt.hs.neighborhoodsearch.BestMoveNeighborhoodSearch
        - class com.bt.hs.neighborhoodsearch.CircularFirstImprovement
        - class com.bt.hs.neighborhoodsearch.FirstImprovement
        - class com.bt.hs....borhoodsearch.FirstLegalMoveNeighborhoodSearch
        - class com.bt.hs....borhoodsearch.RestartFirstImprovement
        - class com.bt.hs.neighborhoodsearch.ThresholdNeighborhoodSearch
            - class com.bt.hs....borhoodsearch.InvariantSimulatedAnnealing
                - class com.bt.examples.cs.CarSequencingISA
- class com.bt.hs.PopulationMethod
- class com.bt.hs.CompositePopulationMethod
    - class com.bt.hs.CrossoverPopulationMethod
    - class com.bt.hs.GenerationPopulationMethod
    - class com.bt.hs.MutationPopulationMethod
    - class com.bt.hs.SearchRestartPopulationMethod
    - class com.bt.hs.SelectionPopulationMethod
- class com.bt.hs.populationrestart.PopulationSearchRestart
    - class com.bt.hs.populationrestart.PopulationReduceRestart
- class com.bt.hs.Search
    - class com.bt.hs.PopulationHeuristicSearch
    - class com.bt.hs.SingleSolutionHeuristicSearch
- class com.bt.hs.restart.SearchRestart

- ☐ class com.bt.hs.restart.ReduceR_start
  - ☐ class com.bt.examples.fa.SelectableValuesReduceRestart
- ☐ class com.bt.hs.selection.Selection
  - ☐ class com.bt.hs.selection.RandomSelection
  - ☐ class com.bt.hs.selection.SUSSelection
- ☐ class com.bt.hs.SingleSolutionMethod
  - ☐ class com.bt.hs.CompositeSingleSolutionMethod
  - ☐ class com.bt.hs.GenerationSingleSolutionMethod
    - ☐ class com.bt.hs.SSG_UsingConstruction
    - ☐ class com.bt.hs.SSG_UsingCurrentProblem
    - ☐ class com.bt.hs.SSG_UsingRandom
  - ☐ class com.bt.hs.LocalSearch
    - ☐ class com.bt.hs.ReduceConflictLocalSearch
  - ☐ class com.bt.hs.PerturbationSingleSolutionMethod
  - ☐ class com.bt.hs.SearchRestartSingleSolutionMethod
- ☐ class com.bt.hs.taboo.Taboo
  - ☐ class com.bt.hs.taboo.IntegerAssignmentTaboo
  - ☐ class com.bt.hs.taboo.SequencesPositionTaboo

What is claimed is:

1. A method of optimizing allocation of resources for a resource allocation problem, the problem being defined by problem variables, problem expressions, problem constraints and an objective function to be optimized in accordance with a predetermined optimization criterion, wherein the problem variables are representative of at least some of resources to be allocated, temporal parameters associated with allocation of the resources, tasks to be performed, costs associated with allocation of resources, capabilities of the resources and capacity of the resources, wherein the problem expressions are representative of relationships between the problem variables, and wherein the problem constraints are representative of constraints placed upon the problem variables, the method comprising:

(i) building a model of said resource allocation problem in accordance with said problem variables, problem expressions, problem constraints, and objective function, whereby a heuristic search method are carried out to optimize a solution for the modeled problem;

(ii) generating a solution to the modeled problem, the solution comprising a set of values representative of at least some of the problem variables;

(iii) generating a further solution to the modeled by:

(a) modifying one or more values in the set of variables representative of at least some of the problem variables for the previously generated solution;

(b) identifying problem expressions directly and indirectly dependent on the modified values and of the dependent problem expressions identified, (c) selecting an identified problem expression from the dependent problem expressions identified at (b), (d) evaluating whether one or more inputs to the selected problem expression has changed, (e) if the or each input has not changed, marking the selected problem expression, and all problem expressions dependent on the said selected problem expression as unchanged, and, if the input has changed, evaluating the selected problem expression and evaluating all problem expressions directly and indirectly dependent on said selected problem expression, (f) selecting the next problem expression identified at (b), and (g) repeating (c)-(e) until there are no further problem expressions to be selected;

(iv) assessing whether the objective function satisfies the predetermined optimization criterion as a result of the change applied at (iii), and, if not, repeating (iii) until the objective function is deemed to satisfy the predetermined optimization criterion;

(v) determining whether the generated further solution better satisfies the objective function and if so, setting the generated further solution as the solution to be modified in (a);

(vi) repeating (iii) through (v) until a predetermined number of solutions have been generated; and (vii) outputting the generated solution which best satisfies the objective function as a solution to the modeled problem.

2. A method according to claim 1, wherein evaluating whether an input to the selected problem expression has changed comprises recursively identifying and evaluating inputs to the input.

3. A method according to claim 1, wherein evaluation of the selected problem expression comprises:

calculating a difference between the value of the changed input before and after the change, and adding the difference to the or each problem expressions dependent thereon.

4. A problem modeling tool embodied in a computer-readable storage medium for optimizing allocation of resources for a resource allocation problem, the problem being defined by problem variables, problem expressions, problem constraints and an objective function to be optimized in accordance with a predetermined optimization criterion, wherein the problem variables are representative of at least some of resources to be allocated, temporal parameters associated with allocation of the resources, tasks to be performed, costs associated with allocation of resources, capabilities of the resources and capacity of the resources, wherein the problem expressions are representative of relationships between the problem variables, wherein the problem constraints are representative of constraints placed upon the problem variables, and the problem modeling tool comprising:

(i) a modeler for building a model of said resource allocation problem in accordance with said problem variables, problem expressions, problem constraints, and objective function, whereby a heuristic search method are carried out to optimize a solution for the modeled problem;

(ii) a solver for generating a solution to the modeled problem, the solution comprising a set of values representative of at least some of the problem variables;

(iii) the solver being further operable to:

(a) modify one or more values in the set of variables representative of at least some of the problem variables for a previously generated solution;

(b) identify problem expressions directly and/or indirectly dependent on the modified values and of the dependent problem expressions identified, (c) select an identified problem expression from the dependent problem expressions identified at (b), (d) evaluate whether one or more inputs to the selected problem expression has changed, (e) in a case where the or each input has not changed, mark the selected problem expression, and all problem expressions dependent on the said selected problem expression as unchanged, and if the input has changed, said solver evaluating the selected problem expression and evaluating all problem expressions directly and indirectly dependent on said selected problem expression, (f) select the next problem expression identified at (b), and (g) repeat (c)-(e) until there are no further problem expressions to be selected, in order to generate further solutions to the modeled problem;

(iv) said solver further assesses whether the objective function satisfies the predetermined optimization criterion as a result of the change applied at (iii), and, if not, repeating at (iii) until the objective function is deemed to satisfy the predetermined optimization criterion;

(v) a tester for determining whether each generated further solution better satisfies the objective function and if so, said tester being further operable to set the generated further solution as the solution to be modified in (a);

(vi) repeating (iii) through (v) until a predetermined number of solutions have been generated; and (vii) a displayer for outputting the generated solution which best satisfies the objective function as a solution to the modeled problem.

5. A problem modeling tool embodied in a computer-readable storage medium according to claim 4, wherein evaluating whether an input to the selected problem expression has changed comprises recursively identifying and evaluating inputs to the input.

6. A problem modeling tool according to claim 4, wherein evaluation of the selected problem expression comprises:
   calculating a difference between the value of the changed input before and after the change, and
   adding the difference to the or each problem expressions dependent thereon.

* * * * *